(12) United States Patent
Furukawa et al.

(10) Patent No.: US 11,242,029 B2
(45) Date of Patent: Feb. 8, 2022

(54) SEAT BELT DEVICE

(71) Applicants: Toyota Jidosha Kabushiki Kaisha, Toyota (JP); Kabushiki Kaisha Tokai Rika Denki Seisakusho, Aichi (JP)

(72) Inventors: Daiki Furukawa, Toyota (JP); Yusuke Hirao, Toyota (JP); Yasuaki Kosugi, Toyota (JP); Shigekazu Imanaka, Toyota (JP); Hideki Kato, Nissin (JP); Katsuya Shimazu, Toyota (JP); Yoshio Mizuno, Aichi-ken (JP); Shigeru Kotama, Aichi-ken (JP); Hikaru Ikefuji, Aichi-ken (JP)

(73) Assignees: TOYOTA JIDOSHA KABUSHIKI KAISHA, Toyota (JP); Kabushiki Kaisha Tokai Rika Denki Seisakusho, Aichi (JP)

( * ) Notice: Subject to any disclaimer, the term of this patent is extended or adjusted under 35 U.S.C. 154(b) by 15 days.

(21) Appl. No.: 16/818,087

(22) Filed: Mar. 13, 2020

(65) Prior Publication Data
US 2020/0290558 A1    Sep. 17, 2020

(30) Foreign Application Priority Data
Mar. 15, 2019    (JP) .............................. JP2019-048836

(51) Int. Cl.
*B60R 22/26* (2006.01)
*B60R 22/18* (2006.01)

(52) U.S. Cl.
CPC ...... *B60R 22/26* (2013.01); *B60R 2022/1806* (2013.01); *B60R 2022/1812* (2013.01)

(58) Field of Classification Search
CPC . B60R 22/26; B60R 22/28; B60R 2022/1812; B60R 2022/1806
USPC ....................................................... 280/801.1
See application file for complete search history.

(56) References Cited

U.S. PATENT DOCUMENTS

| 5,664,807 | A | * | 9/1997 | Bohmler | ............. B60R 22/1952 |
| | | | | | 280/805 |
| 5,908,219 | A | | 6/1999 | Bohmler | |
| 6,068,664 | A | * | 5/2000 | Meyer | ................. B60R 22/1952 |
| | | | | | 280/806 |

(Continued)

FOREIGN PATENT DOCUMENTS

| JP | H08268224 A | 10/1996 |
| JP | H10059126 A | 3/1998 |

(Continued)

*Primary Examiner* — James A English
*Assistant Examiner* — Caitlin Anne Miller
(74) *Attorney, Agent, or Firm* — Dinsmore & Shohl LLP

(57) ABSTRACT

A seat belt device includes a buckle provided on a side portion of a seat for a vehicle, and configured such that a tongue plate is inserted into the buckle; a buckle force limiter mechanism connected to the buckle via a connecting member having an elongate shape, the buckle force limiter mechanism being configured to allow the buckle to move in a pulling direction when a tensile load equal to or larger than a predetermined tensile load is applied to the buckle; and a case covering the connecting member from an inner side in a seat width direction, the case having a corner at an upper end portion of the case, the corner facing the connecting member, and the corner having an arc shape.

8 Claims, 4 Drawing Sheets

(56) References Cited

U.S. PATENT DOCUMENTS

| | | | |
|---|---|---|---|
| 6,354,528 B1* | 3/2002 | Nagata | B60R 22/405 |
| | | | 242/374 |
| 6,581,960 B1* | 6/2003 | Schondorf | B60R 21/01546 |
| | | | 180/273 |
| 8,585,090 B2* | 11/2013 | Lane, Jr. | B60R 22/1952 |
| | | | 280/806 |
| 9,272,686 B2* | 3/2016 | Chang | H02K 23/30 |
| 10,399,538 B2* | 9/2019 | Hata | B60R 22/20 |
| 10,723,309 B2* | 7/2020 | Ohno | B60N 2/0732 |
| 2011/0221178 A1* | 9/2011 | Lane, Jr. | B60R 22/1955 |
| | | | 280/806 |
| 2016/0264095 A1* | 9/2016 | Bruderick | B60N 2/305 |
| 2019/0071053 A1 | 3/2019 | Imanaka et al. | |

FOREIGN PATENT DOCUMENTS

| | | |
|---|---|---|
| JP | H10100860 A | 4/1998 |
| JP | 2004-161037 A | 6/2004 |
| JP | 2009-208616 A | 9/2009 |
| JP | 2019-043435 A | 3/2019 |

\* cited by examiner

SEAT BELT DEVICE

CROSS-REFERENCE TO RELATED APPLICATIONS

This application claims priority to Japanese Patent Application No. 2019-048836 filed on Mar. 15, 2019, which is incorporated herein by reference in its entirety including the specification, drawings and abstract.

BACKGROUND

1. Technical Field

The disclosure relates to a seat belt device.

2. Description of Related Art

Japanese Unexamined Patent Application Publication No. 10-100860 (JP 10-100860 A) discloses a structure in which a buckle and a load generating portion are connected by a seat belt. When the seat belt is pulled at the time of a collision of a vehicle, a wire material is drawn out from the load generating portion by a predetermined length, and the buckle is moved so that the seat belt is loosened.

SUMMARY

There is a structure including a buckle force limiter mechanism as described in JP 10-100860 A, in which a connecting member that connects the buckle and a force limiter mechanism is covered with a case from an inner side in a seat width direction such that entry of foreign substances is restrained. However, when the connecting member is pulled toward an occupant in the case of an oblique collision of the vehicle, the buckle may not be sufficiently moved due to a frictional force generated by interference between the connecting member and the case. Accordingly, there is room for improvement to stably operate the buckle force limiter mechanism.

The disclosure provides a seat belt device in which a buckle force limiter mechanism is stably operated.

An aspect of the disclosure relates to a seat belt device including a buckle provided on a side portion of a seat for a vehicle, and configured such that a tongue plate is inserted into the buckle; a buckle force limiter mechanism connected to the buckle via a connecting member having an elongate shape, the buckle force limiter mechanism being configured to allow the buckle to move in a pulling direction when a tensile load equal to or larger than a predetermined tensile load is applied to the buckle; and a case covering the connecting member from an inner side in a seat width direction, the case having a corner at an upper end portion of the case, the corner facing the connecting member, and the corner having an arc shape.

In the above configuration, the buckle is provided on the side portion of the seat for the vehicle, and the tongue plate is inserted into the buckle. The buckle is connected to the buckle force limiter mechanism via the connecting member having an elongate shape. The buckle force limiter mechanism is configured to allow the buckle to move in the pulling direction when the tensile load equal to or larger than the predetermined tensile load is applied to the buckle. Thus, for example, when the seat belt is pulled by an occupant at the time of a collision of the vehicle, the tensile load is input to the buckle force limiter mechanism via the buckle and the connecting member, and the buckle is allowed to move in the pulling direction.

Further, the connecting member is covered with the case from the inner side in the seat width direction. Here, the corner at the upper end portion of the case is rounded into an arc shape, the corner facing the connecting member. Thus, even when the connecting member is pulled toward the occupant, it is possible to reduce a frictional force generated due to interference between the connecting member and the case. Here, the "arc shape" is not limited to an arc shape formed by a curved line, and represents a concept including an arc shape formed by connecting a plurality of straight lines.

In the above configuration, the buckle force limiter mechanism can be stably operated.

In the seat belt device according to the above aspect, an upper end of an arc-shaped portion of the corner may be provided inward of a movable range in the seat width direction, the movable range being a range in which the connecting member is movable in the seat width direction.

In the above configuration, even when the connecting member is pulled toward the occupant, the connecting member does not contact the upper end of the arc-shaped portion.

In the above configuration, the connecting member can be restrained from being caught by the upper end of the arc-shaped portion.

In the seat belt device according to the above aspect, the case may include a case body made of metal and a resin plate provided on a side of the case body, the side of the case body facing the connecting member; the resin plate may be made of a resin having a smaller friction coefficient than a friction coefficient of the case body; and a corner at an upper end portion of the resin plate may have an arc shape, the corner at the upper end portion of the resin plate facing the connecting member.

In the above configuration, since the case body is made of metal, a sufficient strength of the case can be ensured. The case body is provided with the resin plate made of the resin having a smaller friction coefficient than the case body, and the corner at the upper end portion of the resin plate is rounded into an arc shape. Thus, as compared with a configuration in which the side of the case, which faces the connecting member, is made of the same metal as the metal forming the case body, the frictional force generated by the interference between the connecting member and the case can be reduced.

In the above configuration, the buckle force limiter mechanism can be operated more reliably.

In the seat belt device according to the above aspect, the connecting member may be made of a belt-shaped cloth material.

In the above configuration, since the connecting member is made of a belt-shaped cloth material that is softer than a wire, the connecting member can be restrained from biting into the resin plate even when the connecting member interferes with the resin plate.

In the above configuration, the connecting member can be restrained from being caught by the case as compared with the configuration in which the connecting member is made of a wire.

In the seat belt device according to the above aspect, the connecting member may be made of a wire, and the case may be made of a high tensile steel.

In the above configuration, since the case is made of a high tensile steel, the strength of the case can be improved.

When the connecting member is made of the wire, the wire can be restrained from biting into the case.

In the above configuration, the connecting member can be restrained from being caught by the case, and the sufficient strength of the case can be ensured.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
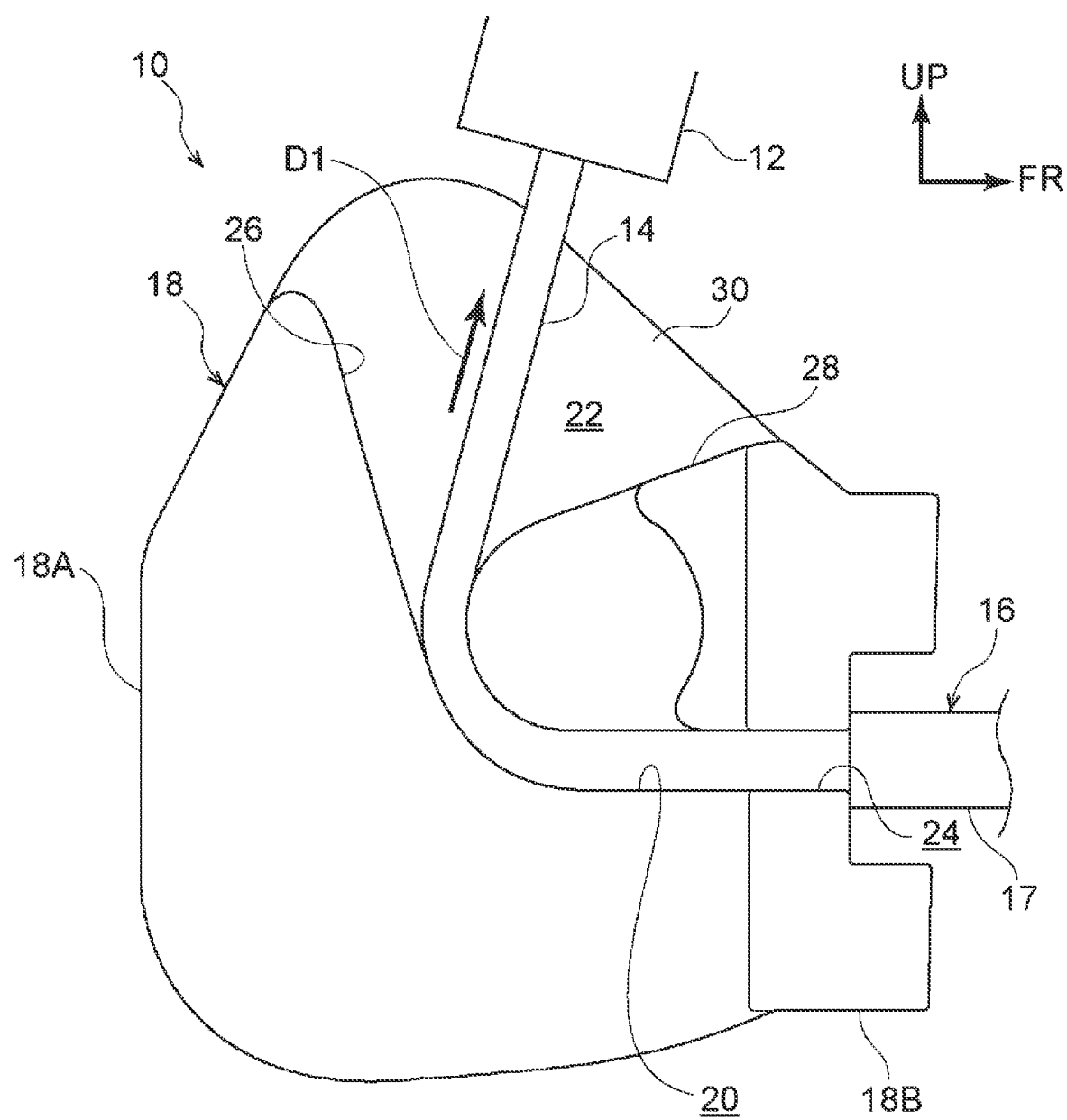
FIG. 1 is a side view of a seat belt device according to a first embodiment as viewed in a seat width direction.

Hereinafter, a seat belt device 10 according to a first embodiment will be described with reference to the drawings. In the drawings, an arrow FR indicates a front side of a seat for a vehicle, an arrow UP indicates an upper side of the seat, and an arrow RH indicates a right side of the seat. Unless otherwise specified, front-rear, right-left, and up-down directions in the description indicate a seat front-rear direction, a seat width direction, and a seat height direction (i.e., a seat up-down direction), respectively. In the present embodiment, the seat height direction, the seat front-rear direction, and the seat width direction match a vehicle height direction (i.e., a vehicle up-down direction), a vehicle front-rear direction, and a vehicle width direction, respectively.

As shown in FIG. 1, the seat belt device 10 according to the present embodiment includes a buckle 12, a wire 14 serving as a connecting member, a buckle force limiter mechanism 16 (hereinafter referred to as "buckle FL mechanism 16" as appropriate), and a case 18.

Figure 2:
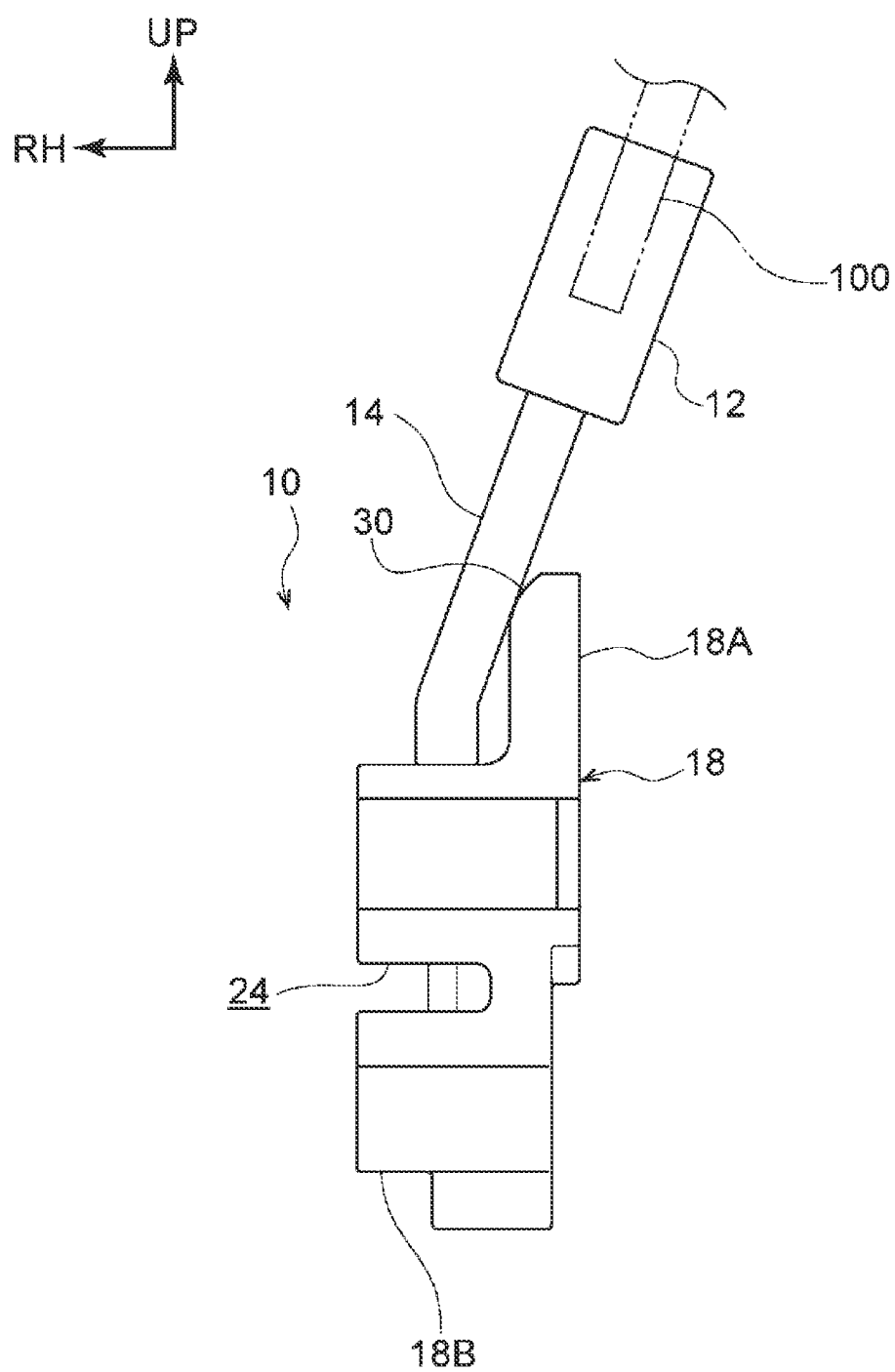
FIG. 2 is a front view of the seat belt device according to the first embodiment as viewed from a front side of a seat.

As shown in FIG. 2, the buckle 12 is provided on a side portion of the seat for a vehicle (not shown), and an insertion port (not shown) into which a tongue plate 100 is inserted is formed on an upper surface of the buckle 12. When the tongue plate 100 is inserted into the insertion port, the tongue plate 100 is locked to the buckle 12 so as not to be pulled out from the buckle 12.

As shown in FIG. 1, one end of the wire 14 is connected to a lower end of the buckle 12. The wire 14 is formed to have a long shape (an elongate shape) and extends from the buckle 12 toward a lower side of the seat. The other end of the wire 14 extends toward a front side of the seat along the case 18 described later, and the buckle FL mechanism 16 is connected to the other end of the wire 14.

The buckle FL mechanism 16 includes a pipe 17 that extends in the seat front-rear direction. A pressing member (not shown) is fitted inside the pipe 17, and the wire 14 is connected to the pressing member. Here, when a tensile load equal to or larger than a predetermined tensile load is applied to the buckle 12 and the wire 14 is pulled in a drawing direction D1, the pressing member inside the pipe 17 moves while expanding the pipe 17. In this way, the buckle FL mechanism 16 is configured to allow the buckle 12 to move in a pulling direction when the tensile load equal to or larger than the predetermined tensile load is applied to the buckle 12. Thus, the seat belt is loosened by operation of the buckle FL mechanism 16.

Here, the wire 14 is covered with the case 18 from the inner side in the seat width direction. The case 18 is formed by processing a sheet steel (i.e., a steel plate). In the present embodiment, the case 18 is made of high tensile steel (i.e., high tensile strength steel), for example.

The case 18 includes a wire guide portion 18A having a thickness in the seat width direction and a stopper portion 18B having a thickness in the seat front-rear direction.

A guide groove 20 for guiding the wire 14 is formed in a center portion of the wire guide portion 18A in the seat height direction. The guide groove 20 extends in the seat front-rear direction, and a front end of the guide groove 20 extends to an opening 24 of the stopper portion 18B described later and is opened to a front side of the case 18 in the vehicle front-rear direction.

The guide groove 20 is curved from a center portion of the wire guide portion 18A in the seat front-rear direction toward the upper side of the seat and is connected to a thin portion 22. The thin portion 22 forms an upper portion of the wire guide portion 18A and is formed thinner than a general portion. Details of the thin portion 22 will be described later.

As shown in FIG. 2, the stopper portion 18B extends from a front end of the wire guide portion 18A toward the right side of the seat (a right side of a driver's seat in a left-hand drive vehicle). The opening 24 is formed in a center portion of the stopper portion 18B in the seat height direction. The opening 24 is opened at an end in a right side (i.e., a right end) of the stopper portion 18B in the seat width direction.

As shown in FIG. 1, the wire 14 is disposed along the guide groove 20. The pipe 17 of the buckle FL mechanism 16, which is connected to the other end of the wire 14, is disposed on a front side of the stopper portion 18B in the vehicle front-rear direction so as to be able to be locked to the stopper portion 18B. Thus, when the wire 14 is pulled in the drawing direction D1, the pipe 17 is locked to the stopper portion 18B, and thus, tension is applied to the pressing member inside the pipe 17 and the pressing member moves while expanding the pipe 17.

Next, details of the thin portion 22 will be described. A surface of the thin portion 22 on the side where the wire 14 is disposed is flush with a groove bottom of the guide groove 20. Thus, the wire 14 is configured to be bent in the seat front-rear direction in a region where the thin portion 22 is formed.

A rear wall surface 26 of the thin portion 22 on a rear side in the seat front-rear direction is inclined toward the rear side of the seat in a direction from the lower side of the seat to the upper side of the seat so as to be continuous with a rear end of the guide groove 20 when viewed in the seat width direction. As an example, in the present embodiment, the rear wall surface 26 is inclined by approximately 15 degrees toward a rear side of the vehicle with respect to the vehicle height direction. Further, an upper end portion of the rear wall surface 26 is curved in a substantially arc shape and connected to an outer surface of the case 18.

In contrast, a front wall surface 28 of the thin portion 22 on a front side in the seat front-rear direction is inclined toward the front side of the seat in a direction from the lower side of the seat to the upper side of the seat as viewed in the seat width direction. As an example, in the present embodiment, the front wall surface 28 is inclined by approximately 70 degrees toward a front side of the vehicle with respect to the vehicle height direction. Therefore, the wire 14 can be bent in the thin portion 22 in the seat front-rear direction in a range between the rear wall surface 26 and the front wall surface 28.

Here, as shown in FIG. 2, a corner 30 at an upper end portion of the thin portion 22 (case 18) is rounded into an arc shape, the corner 30 facing the wire 14.

Figure 3:
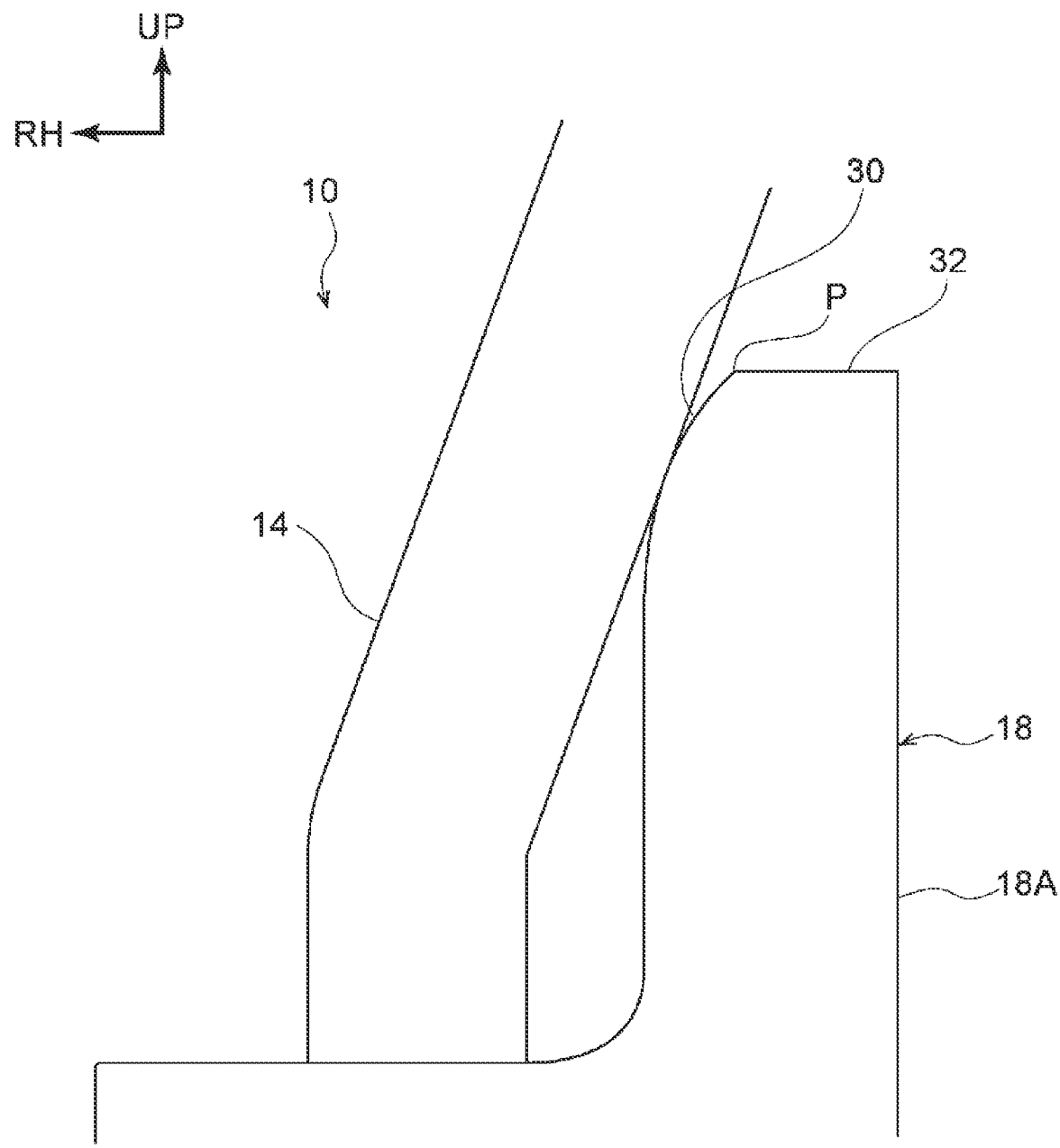
FIG. 3 is an enlarged view showing a main part of FIG. 2.

As shown in FIG. 3, the corner 30 has a substantially arc shape that bulges toward the right side of the seat and toward the upper side of the seat, and an upper end P of the corner 30 (that is, a boundary between the corner 30 and an upper surface 32 of the case 18) is provided on a left side in the seat width direction (on an inner side in the seat width direction) with respect to a movable range of the wire 14 in the seat width direction (in other words, the upper end P of the corner 30 is provided inward of the movable range in the seat width direction, the movable range being a movable range in which the wire is movable in the seat width direction). That is, the upper end P is set in consideration of ease of bending the wire 14, etc.

Further, as shown in FIG. 1, the corner 30 is rounded in an entire region of the thin portion 22 from the rear wall surface 26 to the front wall surface 28.

Next, the effects of the present embodiment will be described.

In the seat belt device 10 according to the present embodiment, the buckle 12 is connected to the buckle FL mechanism 16 via the elongate wire 14. The buckle FL mechanism 16 is configured to allow the buckle 12 to move in the pulling direction when the tensile load equal to or larger than the predetermined tensile load is applied to the buckle 12. Thus, for example, when the seat belt is pulled by an occupant at the time of a vehicle collision, the tensile load is input to the buckle FL mechanism 16 via the buckle 12 and the wire 14, and thus, the buckle 12 is allowed to move in the pulling direction.

Further, the wire 14 is covered with the case 18 from the inner side in the seat width direction in the present embodiment. Here, since the corner 30 at the upper end portion of the case 18, which faces the wire 14, is rounded in an arc shape, even when the wire 14 is pulled toward the occupant at the time of the vehicle collision, it is possible to reduce a frictional force generated due to interference between the wire 14 and the case 18. As a result, the buckle FL mechanism 16 can be stably operated.

In particular, in the present embodiment, the corner 30 is rounded in the entire region of the thin portion 22 between the rear wall surface 26 and the front wall surface 28. As a result, as in the case where the occupant moves obliquely forward due to inertia at the time of an oblique collision, even when the wire 14 connected to the buckle 12 is pulled while falling toward a left side of the vehicle (i.e., the case 18-side), which is a collision side, and toward the front side of the vehicle via the seat belt, the frictional force generated by the interference between the wire 14 and the case 18 can be reduced.

Furthermore, in the present embodiment, the upper end P of an arc-shaped portion of the corner 30 is provided on the inner side in the seat width direction relative to the movable range of the wire 14 in the seat width direction (in other words, the upper end P of the arc-shaped portion of the corner 30 is provided inward of the movable range in the seat width direction, the movable range being a movable range in which the wire 14 is movable in the seat width direction). Thus, even when the wire 14 is pulled toward the occupant, the wire 14 does not contact the upper end P. This can restrain the wire 14 from being caught by the upper end P.

Still further, in the present embodiment, the case 18 is made of the high tensile steel. Thus, the strength of the case 18 can be improved and the wire 14 can be restrained from biting into the case 18 even when the buckle FL mechanism 16 is connected to the buckle 12 by the wire 14. In other words, when the case 18 is made of a low-strength material, the wire 14 may bite into the case 18 and be caught by the case 18. As in the present embodiment, since the case 18 is made of the high tensile steel having a strength higher than that of the wire 14, the wire 14 can be restrained from being caught by the case 18.

Next, a seat belt device 50 according to a second embodiment will be described. Components that are the same as or similar to those in the first embodiment are denoted by the same reference characters, and description thereof will be omitted.

Figure 4:
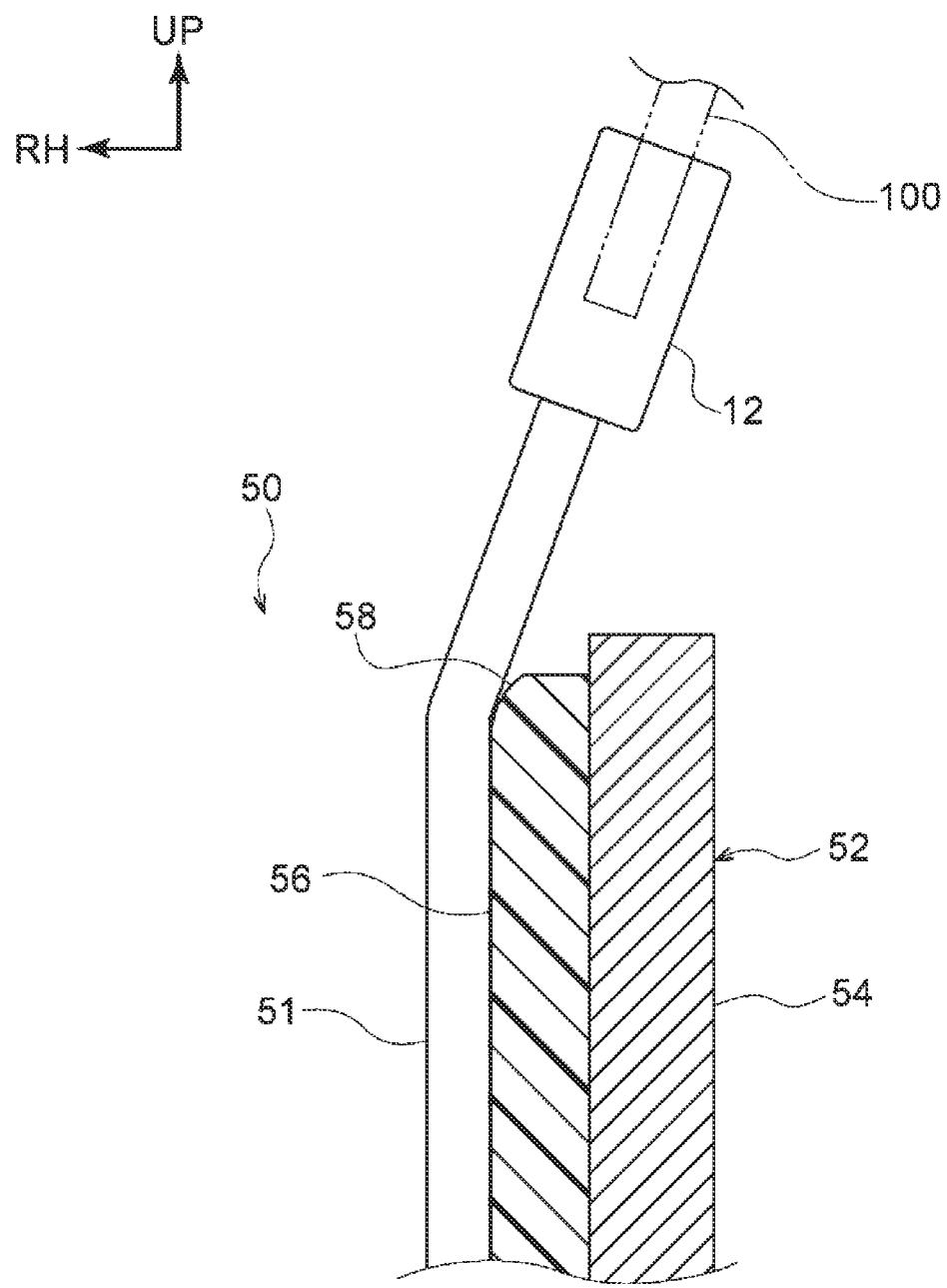
FIG. 4 is a sectional view of a seat belt device according to a second embodiment as viewed from the front side of the seat.

As shown in FIG. 4, in the seat belt device 50 according to the present embodiment, one end of a webbing 51 serving as a connecting member is connected to the lower end of the buckle 12. Similarly to the seat belt, the webbing 51 is made of a belt-shaped cloth material, and has an elongate shape. The webbing 51 extends from the buckle 12 toward the lower side in the seat height direction. The other end of the webbing 51 extends toward the front side of the seat along a case 52, and is connected to the buckle FL mechanism 16 that is the same as or similar to the buckle FL mechanism 16 (see FIG. 1) described in the first embodiment.

Here, the case 52 of the present embodiment includes a metal case body 54 and a resin plate 56 made of a resin. The case body 54 is made of high tensile steel and forms the left side of the case 52 in the vehicle width direction.

The resin plate 56 is provided on a side of the case body 54, which faces the webbing 51. Here, the resin plate 56 is made of a resin having a smaller friction coefficient than a friction coefficient of the case body 54. A corner 58 at an upper end portion of the resin plate 56 is rounded into an arc shape, the corner 58 facing the webbing 51.

Next, the effects of the present embodiment will be described.

In the seat belt device 50 according to the present embodiment, the case body 54 is made of metal, and thus, the sufficient strength of the case 52 can be ensured. The case body 54 is provided with the resin plate 56 made of a resin having a smaller friction coefficient than the friction coefficient of the case body 54, and the corner 58 at the upper end portion of the resin plate 56 is rounded into an arc shape. Thus, as compared with a configuration in which the side of the case 52, which faces the webbing 51, is made of the same metal as the metal forming the case body 54, a frictional force generated by the interference between the webbing 51 and the case 52 can be reduced. As a result, the buckle FL mechanism 16 can be operated more reliably.

In the present embodiment, the buckle 12 and the buckle FL mechanism 16 are connected by the webbing 51 that is softer than the wire 14. Thus, even when the webbing 51 interferes with the resin plate 56, the webbing 51 can be restrained from biting into the resin plate 56. As a result, as compared with a configuration in which the webbing 51 is made of the wire 14, it is possible to restrain the webbing 51 from being caught by the case. Other effects are similar to those in the first embodiment.

The seat belt devices according to the first and second embodiments have been described above, but the disclosure can be implemented in various ways without departing from the scope of the disclosure. For example, in the above embodiments, the corner 30 and the corner 58 have curved surfaces, but the disclosure is not limited to this structure.

For example, the corner may be formed in an arc shape as a whole by connecting a plurality of straight lines as viewed in the vehicle front-rear direction. Even in this case, the frictional force generated by the interference between the wire 14 and the case 18 can be reduced.

In the above embodiments, the case 18 is made of the high tensile steel, but the disclosure is not limited to this structure. The case 18 may be made of other metals.

Further, the buckle FL mechanism 16 in the above embodiments is configured to loosen the seat belt through movement of the pressing member inside the pipe 17 while the pushing member pushes and expands the pipe 17, but the disclosure is not limited to this configuration. For example, a seat belt force limiter described in JP 10-100860 A may be employed. In this case, a cylindrical housing of the seat belt force limiter may be disposed so as to be locked to the stopper portion 18B of the case 18.

What is claimed is:

1. A seat belt device comprising:
   a buckle provided on a side portion of a seat for a vehicle, and configured such that a tongue plate is inserted into the buckle;
   a buckle force limiter mechanism connected to the buckle via a connecting member having an elongate shape, the buckle force limiter mechanism being configured to allow the buckle to move in a pulling direction when a tensile load equal to or larger than a predetermined tensile load is applied to the buckle; and
   a case covering the connecting member from an inner side in a seat width direction and including a thin portion provided with a rear wall surface and a front wall surface, the rear wall surface being continuous with a guide groove, the case having a corner, the corner having an arc shape at an upper end portion of the case from the rear wall surface to the front wall surface of the thin portion that faces the connecting member.

2. The seat belt device according to claim 1, wherein an upper end of the arc shape of the corner is provided inward of a movable range in the seat width direction, the movable range being a range in which the connecting member is movable in the seat width direction.

3. The seat belt device according to claim 1, wherein:
   the case includes a case body made of metal and a resin plate provided on a side of the case body, the side of the case body facing the connecting member;
   the resin plate is made of a resin having a smaller friction coefficient than a friction coefficient of the case body; and
   a corner at an upper end portion of the resin plate has an arc shape, the corner at the upper end portion of the resin plate facing the connecting member.

4. The seat belt device according to claim 3, wherein the connecting member is made of a belt-shaped cloth material.

5. The seat belt device according to claim 1, wherein the connecting member is made of a wire, and the case is made of a high tensile steel.

6. A seat belt device comprising:
   a buckle provided on a side portion of a seat for a vehicle, and configured such that a tongue plate is inserted into the buckle;
   a buckle force limiter mechanism connected to the buckle via a connecting member having an elongate shape, the buckle force limiter mechanism being configured to allow the buckle to move in a pulling direction when a tensile load equal to or larger than a predetermined tensile load is applied to the buckle; and
   a case covering the connecting member from an inner side in a seat width direction, the case having a corner, at an upper end portion of the case, the corner facing the connecting member, and the corner having an arc shape,
   wherein an upper end of an arc-shaped portion of the corner is provided inward of a movable range in the seat width direction, the movable range being a range in which the connecting member is movable in the seat width direction.

7. A seat belt device comprising:
   a buckle provided on a side portion of a seat for a vehicle, and configured such that a tongue plate is inserted into the buckle;
   a buckle force limiter mechanism connected to the buckle via a connecting member having an elongate shape, the buckle force limiter mechanism being configured to allow the buckle to move in a pulling direction when a tensile load equal to or larger than a predetermined tensile load is applied to the buckle; and
   a case covering the connecting member from an inner side in a seat width direction, the case having a corner, at an upper end portion of the case, the corner facing the connecting member, and the corner having an arc shape, wherein:
   the case includes a case body made of metal and a resin plate provided on a side of the case body, the side of the case body facing the connecting member;
   the resin plate is made of a resin having a smaller friction coefficient than a friction coefficient of the case body; and
   a corner at an upper end portion of the resin plate has an arc shape, the corner at the upper end portion of the resin plate facing the connecting member.

8. The seat belt device according to claim 7, wherein the connecting member is made of a belt-shaped cloth material.

* * * * *